US007956329B2

(12) United States Patent
Laluvein et al.

(10) Patent No.: US 7,956,329 B2

(45) Date of Patent: Jun. 7, 2011

(54) FLAME DETECTOR AND A METHOD

(75) Inventors: Bernard E. H Laluvein, Eastcote (GB); Timothy A. James, Harrow (GB)

(73) Assignee: Thorn Security Limited, Sunbury-on-Thames, Middlesex (GB)

( * ) Notice: Subject to any disclaimer, the term of this patent is extended or adjusted under 35 U.S.C. 154(b) by 78 days.

(21) Appl. No.: 11/921,111

(22) PCT Filed: Feb. 17, 2006

(86) PCT No.: PCT/GB2006/000581

§ 371 (c)(1), (2), (4) Date: May 27, 2008

(87) PCT Pub. No.: WO2006/125936

PCT Pub. Date: Nov. 30, 2006

(65) Prior Publication Data

US 2009/0127464 A1 May 21, 2009

(30) Foreign Application Priority Data

May 27, 2005 (GB) .................................. 0510917.8

(51) Int. Cl.

*G01J 5/02* (2006.01)
*G01C 25/00* (2006.01)
*G01N 21/55* (2006.01)

(52) U.S. Cl. .................... 250/339.15; 702/116; 356/445

(58) Field of Classification Search ............. 250/339.15, 250/342; 340/578; 702/116; 356/445, 446, 356/447, 448

See application file for complete search history.

(56) References Cited

U.S. PATENT DOCUMENTS

| | | | | |
|---|---|---|---|---|
| 3,952,196 | A | 4/1976 | Larsen | |
| 4,405,234 | A | 9/1983 | Juaire | |
| 4,464,575 | A | 8/1984 | Cholin et al. | |
| 4,529,881 | A | 7/1985 | Ceurvels et al. | |
| 4,547,673 | A * | 10/1985 | Larsen et al. | 250/554 |
| 4,728,794 | A | 3/1988 | Allen | |
| 4,752,768 | A | 6/1988 | Steers et al. | |
| 4,823,015 | A * | 4/1989 | Galvin et al. | 250/564 |

(Continued)

FOREIGN PATENT DOCUMENTS

AT E 37 454 B 11/1982

(Continued)

OTHER PUBLICATIONS

International Lecture Seminar, Conference Proceedings p. 119-133; "Developments in Flame Detectors".

(Continued)

*Primary Examiner* — David P Porta
*Assistant Examiner* — Faye Boosalis
(74) *Attorney, Agent, or Firm* — Brinks Hofer Gilson & Lione

(57) ABSTRACT

A flame detector is provided which comprises a housing (1), a test source of electromagnetic radiation (4) and a sensor (7). The source of electromagnetic radiation (4) and the sensor (7) are mounted within the housing (1). The source of electromagnetic radiation (4) is arranged to direct its output onto the sensor (7). The source of electromagnetic radiation (4) is arranged to emit radiation which simulates a flame. In this way, a means is provided within the housing (1) of the flame detector to test the flame detector without the need for an external test source, such as a test fire or a bulky and expensive test torch.

22 Claims, 1 Drawing Sheet

U.S. PATENT DOCUMENTS

| | | | | |
|---|---|---|---|---|
| 4,826,316 | A | | 5/1989 | Odum |
| 4,864,146 | A | | 9/1989 | Hodges et al. |
| 5,264,708 | A | | 11/1993 | Hijikata |
| 5,495,112 | A | | 2/1996 | Maloney et al. |
| 5,561,290 | A | * | 10/1996 | Strobel et al. .............. 250/252.1 |
| 5,627,362 | A | * | 5/1997 | Youngquist et al. .......... 250/205 |
| 5,914,489 | A | | 6/1999 | Baliga et al. |
| 6,078,050 | A | * | 6/2000 | Castleman ............... 250/339.15 |
| 6,831,288 | B1 | | 12/2004 | Schmitt et al. |
| 2009/0103097 | A1 | | 4/2009 | Laluvein et al. |

FOREIGN PATENT DOCUMENTS

| | | | | |
|---|---|---|---|---|
| DE | 2 108 296 | | | 8/1972 |
| DE | 26 03 824 | A1 | | 8/1976 |
| DE | 42 40 395 | A1 | | 6/1994 |
| DE | 195 31 917 | C1 | | 3/1997 |
| EP | 0 864 811 | | | 11/1982 |
| EP | 0 078 443 | A2 | | 5/1983 |
| EP | 0 112 498 | B1 | | 7/1984 |
| EP | 0 409 266 | A2 | | 1/1991 |
| EP | 0 370 763 | B1 | | 6/1995 |
| EP | 0 532 768 | B1 | | 8/1995 |
| EP | 0 953 952 | A2 | | 11/1999 |
| GB | 2 097 120 | A | | 10/1982 |
| GB | 2 309 300 | A | | 7/1997 |
| GB | 2 349 459 | A | | 11/2000 |
| GB | 2 395 260 | A | | 5/2004 |
| JP | 06282774 | A | | 10/1994 |
| JP | 2002298242 | | | 10/2002 |
| JP | 2002298242 | A | * | 10/2002 |
| JP | 2003296848 | | | 10/2003 |
| JP | 2005121490 | | | 5/2005 |
| WO | WO 96/06865 | | | 3/1996 |
| WO | WO 9606865 | A1 | * | 3/1996 |
| WO | WO 2004/019298 | A2 | | 3/2004 |

OTHER PUBLICATIONS

User Manual for Infra-Red Flame Detection “S200+ Series Triple IR Flame Detectors” (67 pgs).
Office Action issued Feb. 19, 2010 in U.S. Appl. No. 11/921,113 (9 pgs).
Response to Opposition to EP 1894178 in the name of Thorn Security Limited dated Feb. 15, 2010 (16 pgs).
Letter from the opponent filed in EP Appln. No. 06709817.8-1232 dated Jul. 19, 1010 (37 pgs) (including translation).
General Monitors, Flame Detection, “Models TL100/TL103—UV/IR Test Lamp” alleged in Letter from the opponent to be dated Dec. 2001.
Letter from Bernt GmbH to Minimax GmbH, “Portable UV/IR—Test Lamp TL 102” dated Dec. 3, 1998 (2pgs).
General Monitors, “Portable Test Lamps for UV and UV/IR Fire Alarm Systems”, TI 102 UV/IR Test Lamp (4 pgs) (including translation).
SharpEye 20/20-310, Long-Rogge IR[3] Fire Simulator, dated Nov. 2002 (1 pg).
SharpEye 20/20-311, Long-Range UV/IR Fire Simulator, dated Nov. 2002 (1 pg).
J.F. Middleton, “*Developments in Flame Detectors*”, Fire Safety Journal 6 (1983) pp. 175-182.
Office Action issued Aug. 6, 2010 in Australian Appl. No. 2006251047 (2 pgs).

* cited by examiner

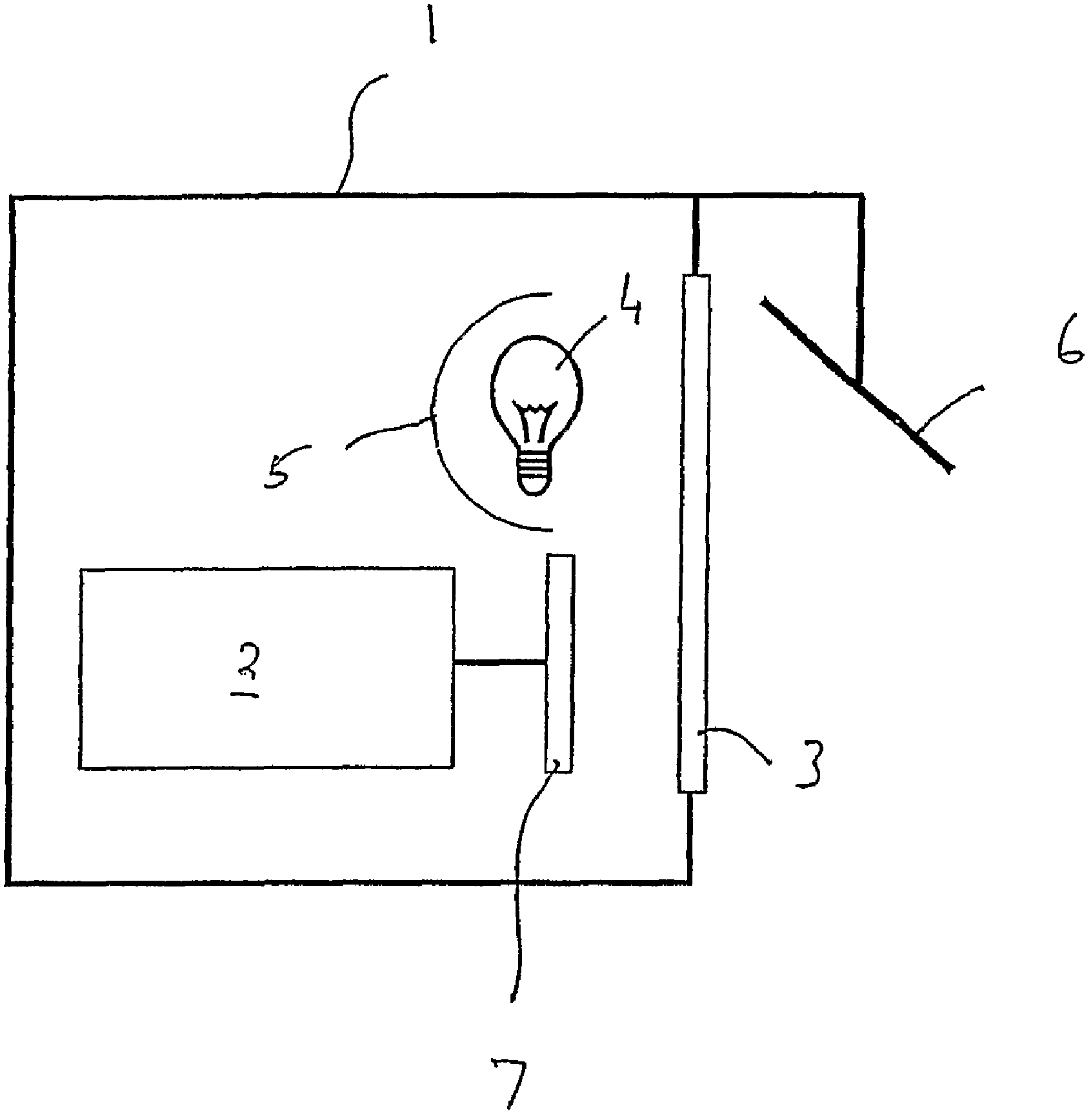
1
4
6
5
2
3
7

FLAME DETECTOR AND A METHOD

RELATED APPLICATION

This application claims the benefit of the prior foreign application GB 0510917.8, filed May 27, 2005. The entire teachings of the above application are incorporated herein by reference.

BACKGROUND OF THE INVENTION

The present invention relates to a flame detector, and in particular to the testing of a flame detector. The present invention also relates to a method of testing the flame detector.

Fire detectors need to be regularly tested to confirm they work. For flame detectors this is performed by using either a small test fire or a simulated flame source. A test fire is not a practical option for regular testing, and so special test torches which simulate a flame source and comprise an infrared emitter and suitable modulator have been developed. If the test torch can be used in close proximity to the detector then it can be relatively small and may be mounted on a pole. However, if the test torch cannot be used in close proximity to the detector then it becomes big, bulky and expensive. This is due to the power required for the torch to generate suitable infrared radiation equivalent to a fire. Furthermore, the problems associated with designing a suitable test torch are compounded by the need for the test torch to be intrinsically safe for use in hazardous areas.

SUMMARY OF THE INVENTION

It is an aim of the present invention to provide an improved flame detector, and test method there for.

According to a first aspect of the invention, there is provided a flame detector comprising a housing, a source of electromagnetic radiation mounted inside the housing and arranged to emit radiation which simulates a flame; the housing having a window that is substantially transparent to the radiation emitted by the source of electromagnetic radiation; a sensor mounted within the housing; and a reflector mounted outside the housing positioned to reflect radiation from the source of electromagnetic radiation onto the sensor; wherein the arrangement is such that the electromagnetic radiation passes through the window twice.

In this way, a means is provided within the housing of the flame detector to test the flame detector without the need for an external test source, such as a test fire or a bulky and expensive test torch.

Preferably, the source of electromagnetic radiation is arranged to emit a pulsed output signal, and advantageously the pulses of the output signal are of irregular frequency so as better to simulate the appearance of a flame. The pulses may occur within the frequency range of about 0.5 to 20 Hz, and preferably, within the frequency range of about 2 to 8 Hz.

The flame detector may comprise a further reflector associated with the source of electromagnetic radiation for directing radiation from the source through the window and onto the said reflector mounted outside the housing.

Preferably, the flame detector comprises a signal processing unit, wherein the sensor is operatively associated with the signal processing unit so as to provide a signal to the said unit in accordance with the radiation received from the source of electromagnetic radiation. Preferably, the signal processing unit is mounted within the housing.

Whilst the sensor may comprise a single sensing element, it may advantageously comprise a plurality of sensing elements. The sensing elements may be operatively associated with the signal processing unit so as to provide a signal to the signal processing unit in accordance with the intensity of radiation received from the source of electromagnetic radiation. Preferably, the sensing elements are arranged in a 16×16 element array.

Advantageously, the flame detector comprises two, or more, test sources of electromagnetic radiation.

Preferably, the or each source of electromagnetic radiation emits infrared radiation, more preferably at a wavelength of about 4.5 μm.

According to a second aspect of the invention, there is provided a method of testing a flame detector, the method comprising the steps of mounting a sensor within a housing of the detector, the sensor being arranged, in use, to receive radiation from a flame and to send an output signal in accordance therewith to a signal processing unit; mounting a test source of electromagnetic radiation within the housing so as to direct its output onto the sensor; controlling the test source so as to emit radiation which simulates a flame, whereby the signal processing unit provides an indication as to the response of the sensor to the simulated flame; and positioning a window in the housing and a reflector outside the housing in positions such that electromagnetic radiation from the test source passes through the window and is reflected back through the window to the sensor thereby to provide an indication of the operational status of the fire detector.

Advantageously, the method may be used to test a flame detector in accordance with the first aspect of the invention.

The method may further comprise the step of comparing the output signal of the sensor at a time when the window is known to be clean with the output signal of the sensor at a subsequent time, whereby the signal processing unit provides an indication of the state of cleanliness of the window based on any difference in said output signals from the sensor.

In this way, a method is provided which can test both the response of the detector to a flame and the cleanliness of the window.

Preferably, the signal processing unit provides an output at a reference level at a time when the window is known to be clean, and provides an output to indicate a first predetermined level of dirtiness when the input to the signal processing unit differs by a first predetermined amount from the input to the signal processing unit at a time when the window was known to be clean.

Preferably, the signal processing unit provides a second output to indicate a second predetermined level of dirtiness when the input of the signal processing unit differs from the input at a time when the window was known to be clean by a second predetermined amount.

Preferably, the source of electromagnetic radiation is controlled so as to emit a pulsed output signal. The pulses of the output signal may be controlled to be of irregular frequency. Preferably, the pulses are controlled to occur within the frequency range of about 0.5 to 20 Hz and, more preferably, about 2 to 8 Hz.

The test may be initiated by a means remote from the housing. The test may be initiated under predetermined conditions. The test may be initiated at a regular time interval.

BRIEF DESCRIPTION OF THE DRAWINGS

The invention will now be described in greater detail, by way of example, with reference to the accompanying drawing, the single FIGURE of which is a schematic representation of a flame detector constructed in accordance with the invention.

DESCRIPTION OF PREFERRED EMBODIMENT

Referring to the drawing, a flame detector has a housing 1 provided with a signal processing unit 2 for measuring and processing the signal received from a sensor array 7. The sensor array 7 detects the presence of a flame external to the detector out through a window 3. A lamp 4 is mounted within the detector housing 1, a concave reflector 5 being associated with the lamp 4 focussing light from the lamp 4 through the window 3 onto an external reflector 6. The lamp 4 is electrically monitored by means of circuitry (not shown) to confirm that it is working and that it is in a light-emitting condition.

The reflector 6 is angled to as so reflect radiation from the lamp 4 through the window 3 onto the sensor array 7 mounted within the housing 1. Typically, the sensor array 7 is constituted by a grid of 16×16 radiation sensing elements. The lamp 4 emits radiation in the same part of the electromagnetic spectrum as the sensor array 7 uses for flame detection, so that the flame detector is tested at the operating wavelength. In this embodiment, the wavelength used is around 4.5 μm.

In use, when the flame detector is being tested, the output of the lamp 4 is modulated to simulate a flame source within the detector range. In this embodiment, the lamp 4 is arranged to produce a pulsed output signal wherein the pulses of the output signal are of irregular frequency within the frequency range of about 2 to 8 Hz. For the test to be successful, the sensor array 7 must detect the radiation emitted by the lamp 4 and the signal processing unit 2 must correctly respond to the simulated flame.

The flame detector also has the facility for measuring the cleanliness of the window 3. The radiation emitted by the lamp 4 and reflected by the external reflector 6 back through the window 3 and onto the sensor array 7 is measured by each of the sensors in the array 7, whose outputs are combined in the signal processing unit to provide an accurate measurement of the cleanliness of the window 3. Following manufacture of the flame detector, the sensor array 7 is used to provide a reference level indicative of a clean window. When the flame detector is positioned for operational use, test measurements are performed, either manually or automatically, on a regular basis. If such a measurement provides a level that falls below a first, predetermined threshold, the window 3 is considered to be partially obscured. If, however, the measured signal falls further, below a second, lower, predetermined threshold, the window 3 is considered to be totally obscured. In either case, the flame detector is arranged to provide a warning signal of the window condition. The warning signal can, for example, be provided by differently-coloured LEDs forming part of the flame detector, or can be transmitted to a central control unit via control circuitry.

It will be apparent that the use of an array 7 of sensors averages the radiation reflected by the reflector 6, thereby given greater resilience to tolerances in the optical path. This is particularly important where the window 3 is subjected to varying degrees of dirtiness. The use of multiple sensors also ensures that the light signal reflected by the reflector 6 can be detected over a relatively wide area. The system can, therefore, cope with greater variations in the optical path, compared to the use of a system utilising a single sensor.

As the signal is detected over a large area, the cleanliness of the window 3 is also measured over a large area, thereby resulting in an improved test of the cleanliness of the window.

It is preferred to use two lamps rather than a single lamp described above, thereby giving resilience to the system in the event of one lamp failing.

The test sequences may be initiated by a remote infrared communication transceiver or by means or commands from a control centre sent over a data communication link. It will be apparent to the person skilled in the art that the flame detector test sequence may be initiated on a regular timed basis where only unsuccessful tests are reported to a control centre.

It will be appreciated that the lamp 4 may emit radiation at a frequency other than 4.5 μm. It is important that the radiation emitted is such as to simulate a fire. For the same reason, the pulses of the output signal may be of irregular frequency in the frequency range of about 0.5 to 20 Hz.

The invention claimed is:

1. A flame detector comprising:

a housing, a sensor mounted within the housing for sensing radiation emitted by a flame;

a signal processing unit for providing an indication of radiation emitted by a flame and sensed by the sensor;

test device for testing the flame detector, the test device comprising:

a source of electromagnetic radiation mounted inside the housing and arranged to emit modulated radiation which simulates a flame, the housing having a window that is substantially transparent to the radiation emitted by the source of electromagnetic radiation; and a reflector mounted outside the housing and positioned to reflect radiation from the source of electromagnetic radiation onto the sensor;

wherein the signal processing unit processes a signal that is indicative of radiation received from the source of electromagnetic radiation following reflection by the reflector; and wherein the electromagnetic radiation emitted by the source of electromagnetic radiation mounted inside the housing passes through the window twice.

2. A flame detector as claimed in claim 1, wherein the source of electromagnetic radiation is arranged to emit a pulsed output signal.

3. A flame detector as claimed in claim 2, wherein the pulses of the output signal are of irregular frequency.

4. A flame detector as claimed in claim 3, wherein the pulses occur within the frequency range of about 0.5 to 20 Hz.

5. A flame detector as claimed in claim 3, wherein the pulses occur within the frequency range of about 2 to 8 Hz.

6. A flame detector as claimed in claim 1, further comprising a concave reflector associated with the source of electromagnetic radiation for focusing radiation from the source through the window and onto the said reflector mounted outside the housing.

7. A flame detector as claimed in claim 1, wherein the signal processing unit is mounted within the housing.

8. A flame detector as claimed in claim 1, wherein the sensor comprises a plurality of sensing elements, and wherein the sensing elements are operatively associated with the signal processing unit so as to provide a signal to the signal processing unit in accordance with the intensity of radiation received from the source of electromagnetic radiation.

9. A flame detector as claimed in claim 8, wherein the sensing elements are arranged in a 16×16 element array.

10. A flame detector as claimed in claim 1, wherein two, or more, sources of electromagnetic radiation are provided within the housing.

11. A flame detector as claimed in claim 1, wherein the or each source of electromagnetic radiation emits infra-red radiation, at a wavelength of about 4.5 μm.

12. In a flame detector comprising a sensor mounted within a housing, the sensor being arranged, in use, to receive radiation from a flame and to send an output signal in accordance therewith to a signal processing unit, a method of testing said flame detector, the method comprising:

modulating a test source of electromagnetic radiation to simulate a flame, the test source mounted within the housing, wherein the modulated radiation passes through a window positioned in the housing and is reflected back through the window by a reflector mounted outside the housing;

sensing, by said sensor within the housing, and providing an output signal indicative of, the reflected modulated radiation; and the signal processing unit providing, responsive to the output signal, an indication of the operational status of the fire detector.

13. A method as claimed in claim 12, wherein the test source of electromagnetic radiation is controlled so as to emit a pulsed output signal.

14. A method as claimed in claim 13, wherein the pulses of the output signal are controlled to be of irregular frequency.

15. A method as claimed in claim 14, wherein the pulses are controlled to occur within the frequency range of about 2 to 8 Hz.

16. A method as claimed in claim 12, wherein said testing is initiated by means remote from the housing.

17. A method as claimed in claim 12, wherein said testing is initiated under predetermined conditions.

18. A method as claimed in claim 12, wherein said testing is initiated at regular time intervals.

19. A method as claimed in claim 12, further comprising comparing the output signal of the sensor at a time when the window is known to be clean with the output signal of the sensor at a subsequent time, whereby the signal processing unit further provides an indication of the state of cleanliness of the window based on any difference in said output signals from the sensor.

20. A method as claimed in claim 12, wherein the signal processing unit provides an output at a reference level at a time when the window is known to be clean, and provides an output to indicate a first predetermined level of dirtiness when the input to the signal processing unit differs by a first predetermined amount from the input to the signal processing unit at a time when the window was known to be clean.

21. A method as claimed in claim 12, wherein the signal processing unit provides a second output to indicate a second predetermined level of dirtiness when the input of the signal processing unit differs from the input at a time when the window was known to be clean by a second predetermined amount.

22. A flame detector comprising:

a housing having a window, a sensor mounted within the housing for sensing radiation emitted by a flame;

a signal processing unit for providing an indication of radiation emitted by a flame and sensed by the sensor;

a source of electromagnetic radiation mounted inside the housing and arranged to emit modulated radiation which simulates a flame; and a reflector mounted outside the housing and positioned to reflect radiation from the source of electromagnetic radiation onto the sensor, wherein the signal processing unit processes a signal that is indicative of radiation received from the source of electromagnetic radiation following reflection by the reflector; and wherein the electromagnetic radiation emitted by the source of electromagnetic radiation mounted inside the housing passes through the window twice.

* * * * *